(12) United States Patent
Tsuji et al.

(10) Patent No.: US 6,351,655 B1
(45) Date of Patent: Feb. 26, 2002

(54) METHOD OF HANDLING REGISTRATION DATA AND TELEPHONE APPARATUS FOR THE SAME

(75) Inventors: Hirokazu Tsuji; Tsutomu Okawa, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/239,040

(22) Filed: Jan. 27, 1999

(30) Foreign Application Priority Data

Jan. 28, 1998 (JP) .......................... 10-015461

(51) Int. Cl.$^7$ ............................. H04B 1/38
(52) U.S. Cl. ................. 455/564; 455/566; 379/355
(58) Field of Search ............... 455/564, 565, 455/566, 550, 403; 379/354, 355, 356

(56) References Cited

U.S. PATENT DOCUMENTS

| | | | | |
|---|---|---|---|---|
| 4,680,785 A | * | 7/1987 | Akiyama et al. | 379/142 X |
| 4,908,853 A | * | 3/1990 | Matsumoto | 379/355 |
| 5,638,438 A | | 6/1997 | Keen | |
| 5,708,804 A | * | 1/1998 | Goodwin et al. | 379/355 X |
| 5,805,164 A | * | 9/1998 | Blum et al. | 345/347 |
| 5,848,356 A | * | 12/1998 | Jambhekar et al. | 455/564 X |
| 5,950,193 A | * | 9/1999 | Kulkarni | 707/3 |
| 6,084,951 A | * | 7/2000 | Smith et al. | 455/564 X |
| 6,125,287 A | * | 9/2000 | Cushman et al. | 455/566 |

FOREIGN PATENT DOCUMENTS

| | | | |
|---|---|---|---|
| EP | 0 526 729 A2 | | 6/1992 |
| JP | 63-299557 | | 12/1988 |
| JP | 1-314456 | | 12/1989 |
| JP | 2-132950 | | 5/1990 |
| JP | 4-78877 | * | 7/1992 |
| JP | 4-318734 | | 11/1992 |
| JP | 5-22395 | | 1/1993 |
| JP | 5-236077 | | 9/1993 |
| JP | 5-323914 | | 12/1993 |
| JP | 8-288996 | | 11/1996 |
| JP | 9-83630 | * | 3/1997 |
| JP | 10-164210 | | 6/1998 |
| JP | 10-164211 | | 6/1998 |
| KR | 97-31473 | | 6/1997 |
| WO | WO 96/15490 | | 5/1996 |

\* cited by examiner

*Primary Examiner*—Tracy Legree
(74) *Attorney, Agent, or Firm*—Scully, Scott, Murphy & Presser

(57) ABSTRACT

A telephone apparatus includes a display unit and a storage unit for storing a plurality of registration data sets randomly registered. Each of the plurality of registration data sets includes a destination name and a phone number of the destination. A grouping section groups the plurality of registration data sets into blocks. Also, a display control section controls the display unit such that at least a part of each of the plurality of registration data sets is displayed in units of blocks in a display mode.

2 Claims, 7 Drawing Sheets

M001: Hirokazu TSUJI :01012345678 : ICON-HOME 20   21              22              23

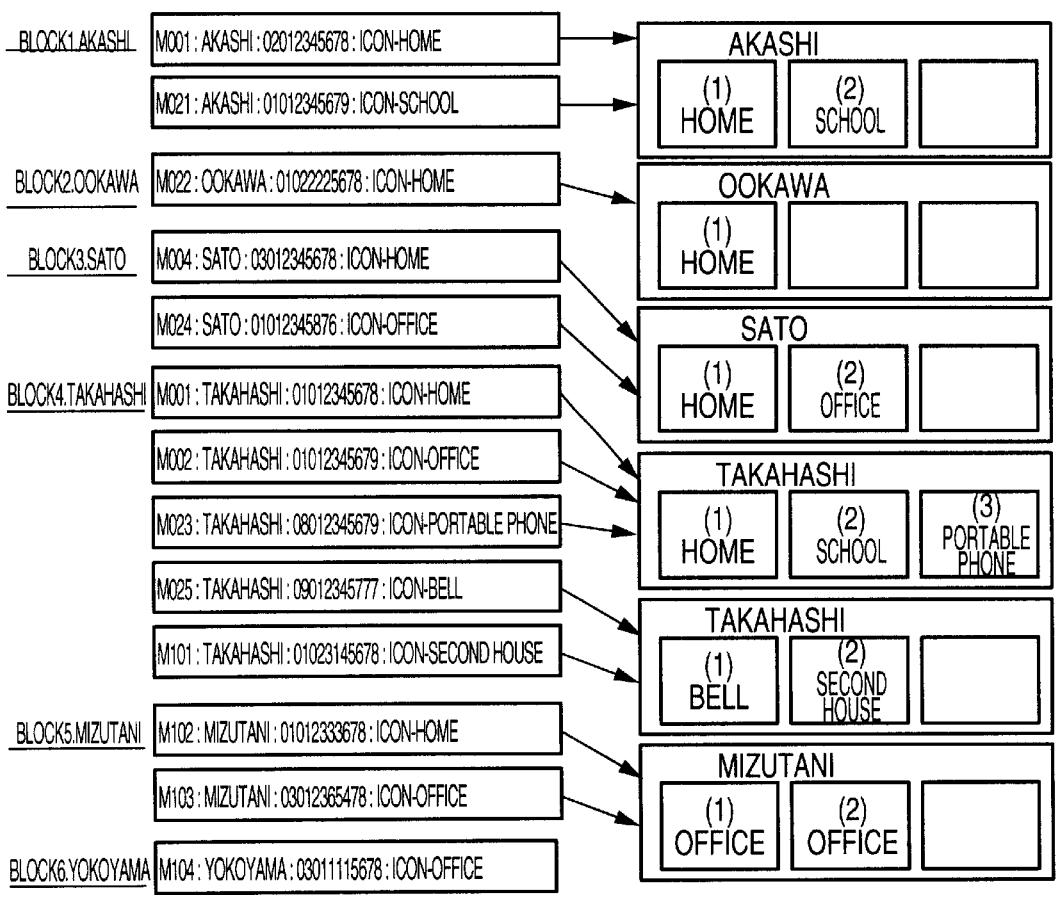

METHOD OF HANDLING REGISTRATION DATA AND TELEPHONE APPARATUS FOR THE SAME

BACKGROUND OF THE INVENTION

1. Field of the Invention

The present invention relates to a handling of a plurality of registration data in a telephone apparatus. More particularly, the present invention relates to a method of handling a plurality of registration data and a telephone apparatus for the same.

2. Description of the Related Art

In a portable phone at present, a destination name and its phone number are previously registered in an abridgment dial memory. When a desirable destination is to be called, the desirable destination is selected from the abridgment dial memory and the call originating is performed. Thus, the user can originate a call to the desirable destination. By such an abridgment dial function, a user of the portable phone needs not to learn the phone number of the desirable destination.

Generally, this kind of portable phone has a large screen section. When such an abridgment dial function is used, a plurality of destination names and their phone numbers are displayed on the screen section. Therefore, in order to select the desirable destination, a scrolling operation is first performed until the desirable destination is displayed on the screen section. Next, a cursor is set to the displayed desirable destination name. Then, determination is last performed. Thus, the desired destination phone number can be determined and a call can be originated. In this way, in the conventional portable phone, many processes must be performed to perform the call originating operation.

On the other hand, in this kind of portable phone, a destination name and a phone number are displayed as a pair. However, it is necessary to indicate whether this phone number corresponds to a phone in a home or in an office. Therefore, in the conventional portable phone, the user cannot easily understand that the user can reliably take a contact with the destination by originating a call during which of time zones.

Also, there is a case where the identical destination has a plurality of phones and each of the phone numbers of the phones is individually registered, that is, where a plurality of pairs of destination name and phone number are registered for the identical destination. In this case, the respective pairs are individually and separately displayed in the screen section with no relation. Thus, it is troublesome to find the desired destination phone number.

In addition to the above conventional portable phone, a TV phone is known in Japanese Laid Open Utility Model Application (JPU-A-Heisei 4-78877). In this reference, the TV phone includes a memory section, a display section, a selection switch and an automatic call originating section. A plurality of icons are stored in the memory section to distinguish of a desired destination. The plurality of icons are displayed as a list on the display section. The automatic call originating section reads out a phone number corresponding to the icon selected by a user using the selection switch from the memory section and performs a call originating operation using the read out phone number.

Also, a telephone is described in Japanese Laid Open Patent Application (JP-A-Heisei 9-83630). In this reference, the telephone an image display unit 13, a touch panel 14, a storage section 5 and a control section 6. Image icons are displayed on the image display unit 13. When one of the image icons is touched through the touch panel 14 so as to select a destination, the control section 6 refers to a table 5A of the storage section 5 to retrieve a phone number and ends the phone number on a telephone line.

SUMMARY OF THE INVENTION

The present invention is accomplished to the above problems. Therefore, an object of the present invention is to provide a method of handling registration data and a telephone apparatus for the same.

Another object of the present invention is to provide a method of handling registration data and a telephone apparatus for the same, in which a call originating operation can be simplified.

Still another object of the present invention is to provide a method of managing and using registration data and a telephone apparatus for the same, in which the registration data are grouped into blocks and a plurality of second data corresponding to every first data can be displayed to be identifiable.

In order to achieve an aspect of the present invention, a telephone apparatus includes a display unit and a storage unit for storing a plurality of registration data sets randomly registered. Each of the plurality of registration data sets includes a destination name and a phone number of the destination. A grouping section groups the plurality of registration data sets into blocks. Also, a display control section controls the display unit such that at least a part of each of the plurality of registration data sets is displayed in units of blocks in a display mode.

Here, the grouping section may group the plurality of registration data sets into the blocks when a new registration data set is registered on the storage section. Instead, the grouping section may group the plurality of registration data sets into the blocks in the display mode.

The display control section divides the block of the registration data sets into sub-blocks in the display mode, when a number of the registration data sets of the block is more than a number of data which can be displayed at a time on the display unit. Then, the display control section controls the display unit such that at least a part of each of the plurality of registration data sets is displayed in units of blocks while each of the blocks of the plurality of registration data sets is displayed in units of sub-blocks.

The display control section may control the display unit such that the phone numbers of the plurality of registration data sets are displayed in units of blocks.

Each of the plurality of registration data sets may include an attribute data indicating an attribute of a destination phone corresponding to the phone number. In this case, the display control section desirably controls the display unit such that the attribute data of the plurality of registration data sets are displayed in units of blocks. Also, it is desirable that the attribute data is displayed as an icon.

In such a case, the telephone apparatus may further include a call originating section for originating a call to one of the phone numbers corresponding to a specific icon in response to specification of the specific icon of the displayed icons in the display mode. Instead, when the icon is allocated with a numeral to be displayed, the telephone apparatus may further include an operation section having a plurality of operation elements, and a call originating section for originating a call to one of the phone numbers corresponding to the numeral of the specific icon in response to an operation of the operation section corresponding to the numeral of the specific icon of the displayed icons in the display mode.

The display control section may control the display unit to display a call origination image when a call originating operation is being performed. In addition, the display control section may control the display unit to display a call arrival image when a call arriving operation is being performed. In this case, the display control section retrieves one of the plurality of registration data sets corresponding to a call originating side and controls the display unit to display at least a part of the retrieved registration data set.

In order to achieve another aspect of the present invention, a method of handling registration data in a telephone apparatus includes the steps of:

- randomly registering a plurality of registration data sets, wherein each of the plurality of registration data sets includes a destination name and a phone number of the destination;
- grouping the plurality of registration data sets into blocks; and
- displaying at least a part of each of the plurality of registration data sets in units of blocks in a display mode.

BRIEF DESCRIPTION OF THE DRAWINGS

FIGS. 5A and 5B are diagrams to explain a grouping operation of the plurality of registration data into blocks in the embodiment of the present invention;

DESCRIPTION OF THE PREFERRED EMBODIMENTS

Next, a portable phone of the present invention will be described below in detail with reference to the attached drawings.

Figure 1:
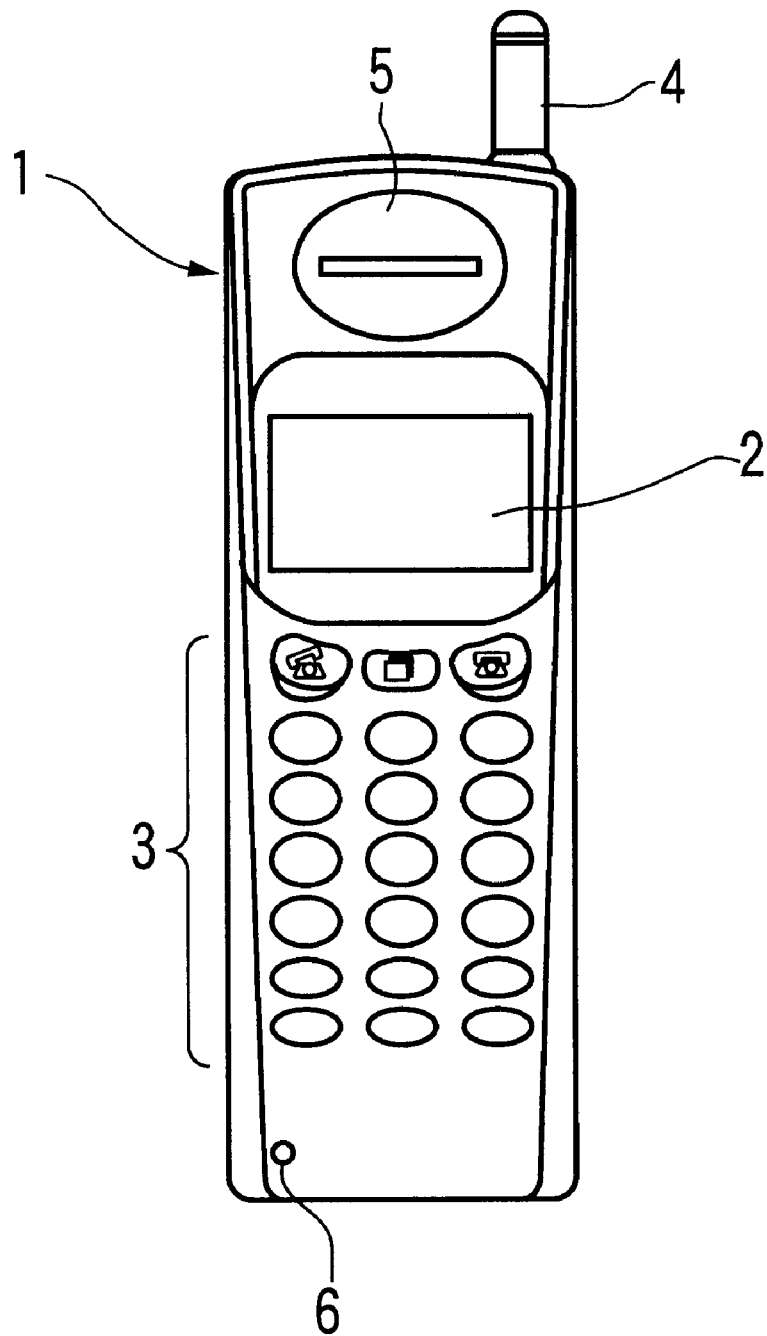
FIG. 1 is a front view of a portable phone according to an embodiment of the present invention.

FIG. 1 is a front view of a portable phone according to an embodiment of the present invention. Referring to FIG. 1, the portable phone 1 in the embodiment is provided with a display section 2, an operation section 3, an antenna 4, a speech receiving section 5 and a speech transmitting section 6.

Figures 2, 3:
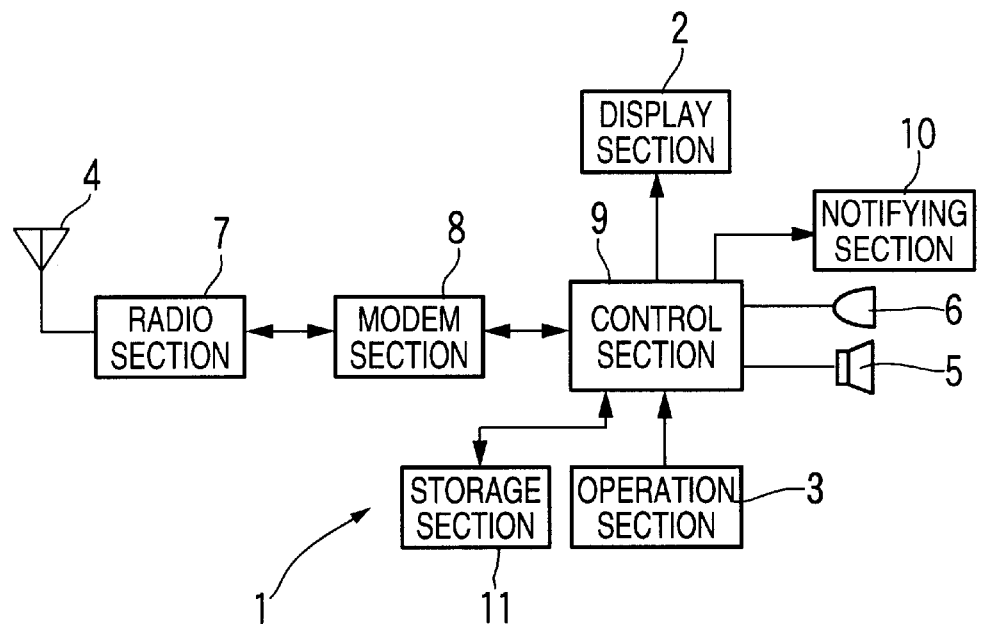
FIG. 2 is a block diagram illustrating the structure of the portable phone according to the embodiment of the present invention.
FIG. 3 is a diagram to explain a data structure of a registration data used in the portable phone according to the embodiment of the present invention.

The antenna 4 is formed on a top portion of the portable phone to transmit and receive electromagnetic wave for communication with a base station (not shown) or a parent station (not shown). The display section 2 displays phone numbers and various data. The operation section 3 is used to perform a call originating operation, a call arriving operation and various registering operations. The speech receiving section 5 outputs a speech, and the speech transmitting section 6 is used to input a speech FIG. 2 is a block diagram illustrating the structure of the portable phone 1 shown in FIG. 1. Referring to FIG. 2, the portable phone 1 has a radio section 7, a modem section 8, a control section 9, a notifying section 10 and a storage section 11 in addition to the display section 2, the operation section 3, the antenna 4, the speech receiving section 5 and the speech transmitting section 6.

When a radio signal is received from the base station or the parent station (not shown) through the antenna 4, the radio section 7 performs amplification of the received signal and frequency conversion of the amplified signal to output an intermediate frequency signal to a modem section 8. The modem section 8 demodulates the intermediate frequency signal supplied from the radio section 7 to output a base band signal to the control section 9. When detecting a call arrival to its own phone by a well-known method, the control section 9 controls the notifying section 10 to notify the call arrival to a user. The notifying section 10 is composed of a speaker 5, an LED 6, and a vibrator (not shown), as well known.

When the operation section 3 is operated by the user of the portable phone 1 in response to the call arrival notice, the control section 9 detects the operation to control the notifying section 10 to stop the call arrival notice and then sets a communication enable state. The operation section 3 is composed of keys such as numeric keys and various function keys, as shown in FIG. 1.

When the received signal indicates the speech communication, the control section 9 drives and controls the speech receiving section 5 and the speech transmitting section 6 to perform the speech communication. On the other hand, when the received signal indicates a data communication, e.g., when the received signal indicates a message, the control section 9 controls the display section 2 to display the received message on the screen section. In this display, the received message may be stored in the storage section 11.

It should be noted that a call arrival display by the display section 2 may be performed independently from or in addition to the call arrival notice by the notifying section 10.

On the other hand, in case of transmission of a signal, when a call originating operation is performed through the operation section 3 by the user, the control section 9 supplies a control signal for line connection to the modem 8. The call originating operation is performed by inputting a phone number from the operation section 3, or by using a phone number or an abridgment phone number which are stored in the storage section 11.

After being modulated by the modem section 8, the transmission signal is frequency converted into a high frequency signal. The high frequency signal is amplified by the radio section 7 and is outputted through the antenna 4.

When the line connection is performed, the control section 9 inputs a signal from the base station or the parent station through the antenna 4 and performs the speech communication or the data communication.

Next, an abridgment dial function or a memory dial function will be described with reference to FIG. 3 and the subsequent drawings.

FIG. 3 is a diagram illustrating a data structure the registration data for the abridgment dial, which is registered in the storage section 11. It should be noted that a registration data for the abridgment dial is shown in FIG. 3, but the present invention is not limited to this.

In FIG. 3, a reference numeral 20 indicates a registration number. Similarly, a reference numeral 21 indicates a destination name and a reference numeral 22 indicates a destination phone number. The data structure of the registration data is composed of a set of the registration number, the destination name and the destination phone number. The data structure is desirably further composed of a specification data as an attribute of the destination phone number for a data classification display 23 to specify a destination phone number. The specification data may be in the form of an icon.

In an example of registration data shown in FIG. 3, a name of "Hirokazu TSUJI", a phone number of "01012345678", a specification data of "home" are given to a registration number "M001". It is desirable that the icon is a pictograph, which shows a classification of the phone numbers, such as a home, an office, a portable phone, a PHS, and a pager.

The registration of such a data into the storage section 11 is executed by the control section 9 in response to an operation of the operation section 3 by the user, when a registration mode is selected through the operation section 3 by the user. In the registration mode, a registration number is first selected. In this selection, a specific registration number may be specified from the operation section 3 or may be selected from among the registration numbers while the registration numbers are scrolled on the display section 2 in order.

Next, a destination name to be registered is inputted from the operation section 3 for the selected registration number. Subsequently, a phone number corresponding to the destination name is inputted from the operation section 3, and a specification data which specifies the classification of the phone number is inputted or selected through the operation section 3. After these data are inputted, an operation to execute registration is performed through the operation section 3. Thereby, the control section 9 stores these data as a set in the storage section 11.

It should be noted that it is not always necessary to input both of the first name and the second name as the destination name and a nickname may be inputted.

Figure 4A:
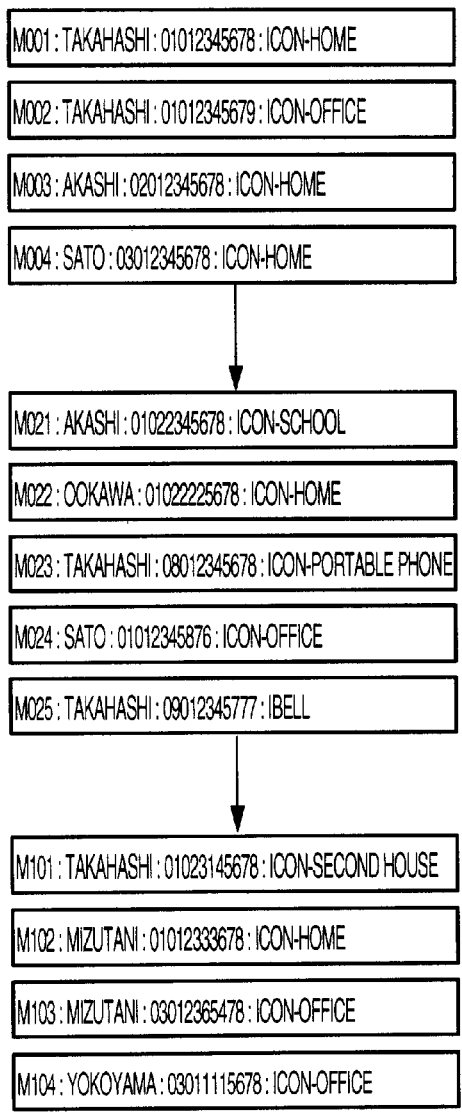
FIGS. 4A and 4B are diagrams to explain a plurality of registration data according to the embodiment of the present invention.

FIGS. 4A shows an example in which a plurality of sets of registration data shown in FIG. 3 are randomly registered. In FIG. 4A, four registration numbers from "M001" to "M004" are registered for the first time. Four registration numbers from "M021" to "M025" are registered for the second time. Four registration numbers from "M101" to "M104" are registered for the third time.

Figure 4B:
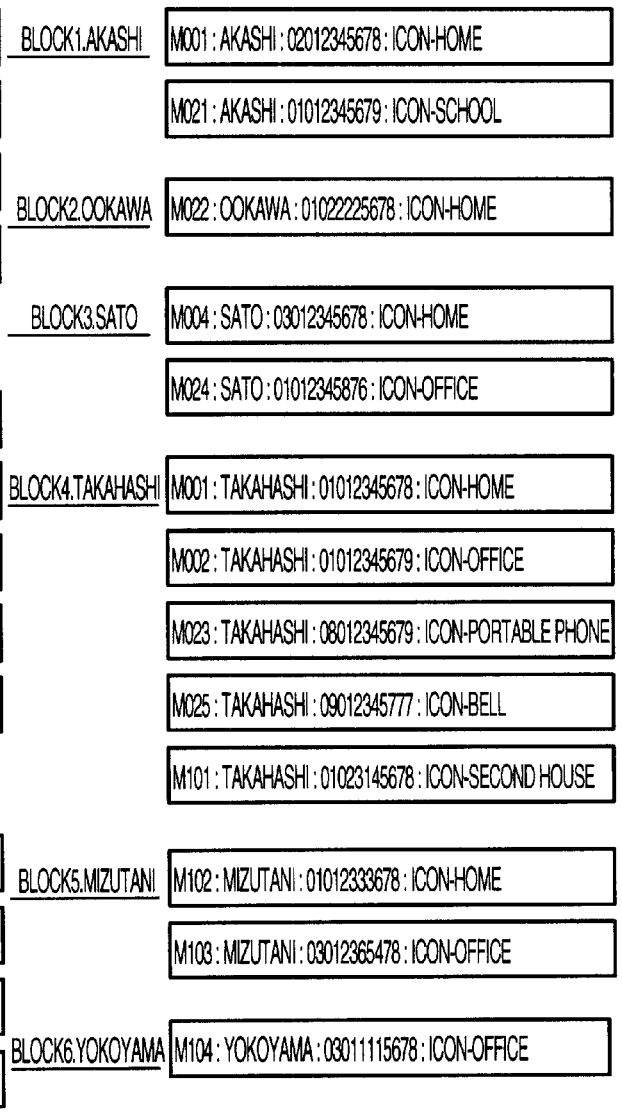

In FIG. 4B, the plurality of registration data randomly registered are sorted in order of the destination name. Also, the plurality of registration data are grouped into blocks in units of destination names as the first data. That is, the plurality of registration data are classified for every first data. The first data has a specific relation to each other, e.g., is the same destination name.

It should be noted that it is not always necessity to sort the plurality of registration data in order of the destination names. Also, the order of the registration data in the same block may be the order of the registration number, the phone number, the classification data or the registration.

The grouping operation into blocks or the sorting operation may be executed when the registration data are read or executed when the registration data is reregistered.

Next, the display of a block of the registration data will be described with reference to FIGS. 5A and 5B.

FIG. 5A is the same as FIG. 4B, and shows a state in which the plurality of registration data are grouped into blocks. On the other hand, FIG. 5B gives a state when each of the blocks of the registration data is displayed on the display section 2. In this way, when a plurality of registration data such as the randomly registered abridgment dials are referred and displayed, the display section 2 displays the registration data corresponding to the destination name which are optionally and individually registered, in units of destination names. For example, as shown in FIG. 4A, the data which is registered on the registration number of "M003" for the first time and the data which is registered on the registration number of "M021" for the second time are displayed in the same block, as shown in FIG. 5B. The display of these data is performed so as to allocate two data to the single destination name. This is because these data have the same destination name. That is, the destination name of "AKASHI" is displayed in a part of a screen section. Also, the classification data indicating a home and the classification data indicating a school are displayed in the other part of the screen section such that one of these data can be selected.

In FIG. 5B, it is shown that up to three classification data as attribute data can be displayed to the single destination name in a display mode. However, the number of displayable classification data is not limited to three. Also, when the registration data are present in the block more than the number of data to be displayable once, the registration data are first displayed for the displayable number of data and then the remaining registration data are displayed through a scrolling operation. For example, it is supposed that five data are registered on the destination name of "TAKAHASHI". In this case, if 3 registration data can be displayed once, three registration data are first displayed and then the scrolling operation is performed so that remaining two registration data can be displayed.

It should be noted that only the second names are shown in FIGS. 4A, 4B, 5A and 5B, to simplify the destination names.

Figure 6:
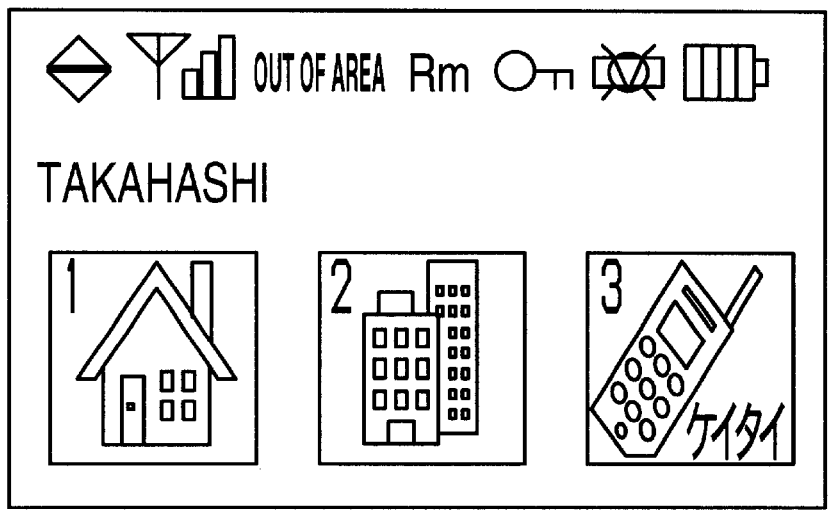
FIG. 6 is a diagram to explain a display example in the embodiment of the present invention.

FIG. 6 shows an example in which the registration data are actually displayed on the display section 2. In this example, icons are shown such as "home", "office" and "portable phone" as the specification data of the registered phone numbers. The phone numbers can be recognized by seeing pictographs of these icons.

Also, as illustrated in the figures, it is desirable that numerals such as 1, 2 and 3 are displayed for the respective icons. In this case, the call originating operation can be simply performed only by operating the numeric keys of the operation section 3 corresponding to these numerals. That is, the control section 9 controls the display section 2 to display the registration data of the block. In this case, the control section 9 knows the registration numbers for the displayed registration data. Therefore, when one of the numeric keys corresponding to the displayed registration data is operated in the display mode, the control section 9 recognizes the operation as a call origination instruction and starts the call origination operation.

Figure 7:
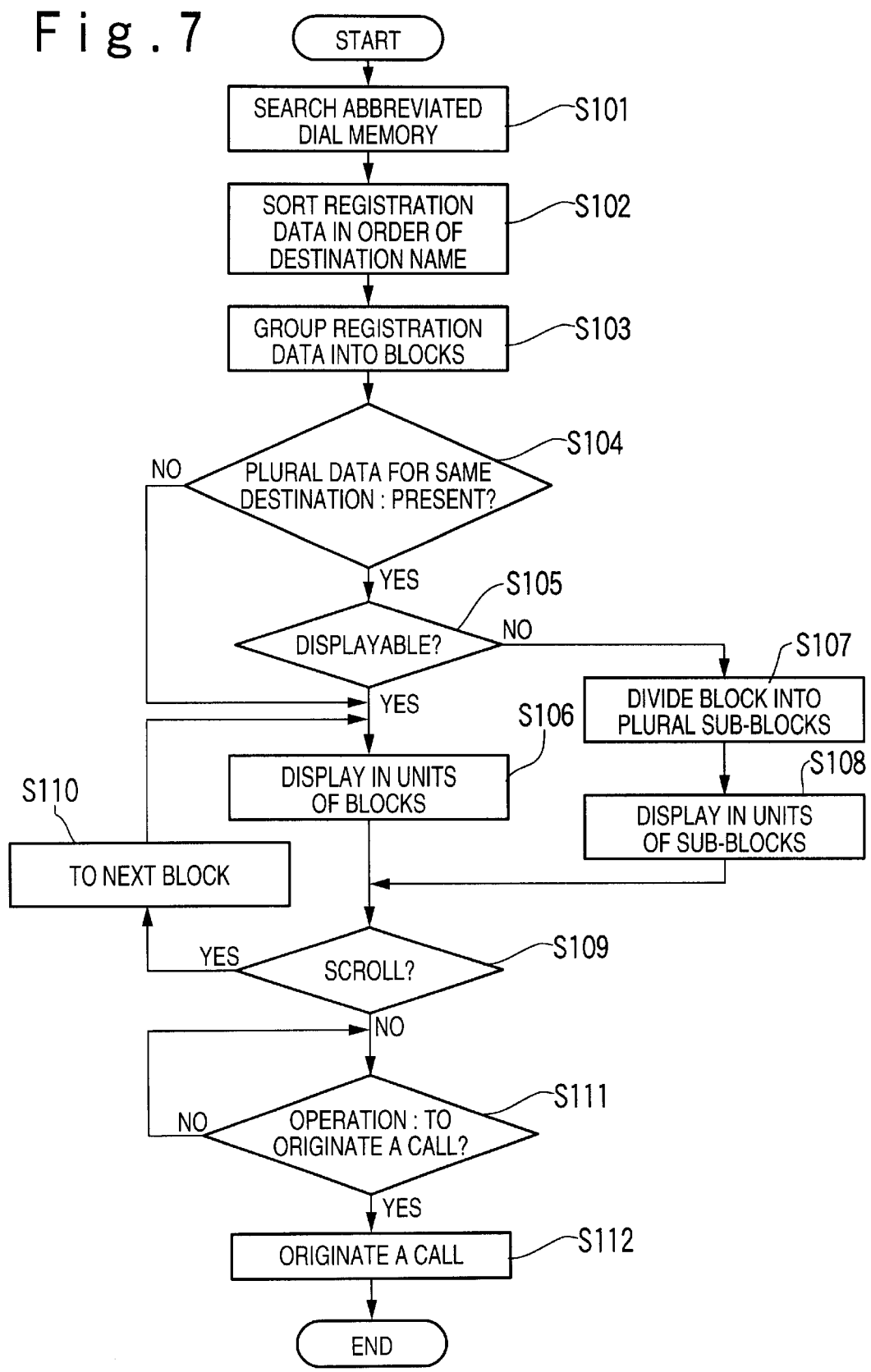
FIG. 7 is a flow chart illustrating the operation of the portable phone according to the embodiment of the present invention.

Next, operations of the portable phone of the present invention from search of a destination phone number to a call origination will be described with reference to a flow chart of FIG. 7. FIG. 7 shown the operations of the portable phone of the present invention from search of a destination phone number to a call origination as an example. This operation is mainly executed by the control section 9.

It is supposed that the user intends to search the abridgment dial table of the storage section 11 for a desired phone number used to originate a call. When the control section 9 detects a search operation from an operation of the operation section 3 (Step S101), the control section 9 sorts the plurality of registration data which are randomly registered on the storage section 11, in order of the destination name (Step S102). Then, the control section 9 groups the plurality of registration data into blocks for every specific relation between destination names, desirably, for every same destination name (Step S103).

Next, whether or not a plurality of phone number are registered for the same destination name is determined (Step S104). When it is determined that the plurality of phone numbers are registered (Step S104, YES), it is determined whether or not the phone numbers for one block can be displayed on the display section 2 once (Step S105).

When it is determined that the phone numbers for the block can be displayed on the display section 2 once (Step S105, YES), the registration data for the block are displayed on the display section 2 (Step S106). Also, when it is determined that the plurality of phone number for the block are not registered (Step S104, NO), the registration data for the block is displayed on the display section 2 (Step S106). In this display, as shown in FIG. 6, it is desirable that the icons for distinguishing the kinds of the phone numbers are displayed rather than the phone numbers are directly displayed.

On the other hand, when it is determined that the registration data for the block are more than the number of data possible to be displayed (Step S105, NO), the registration data are divided into sub-blocks and displayed in units of sub-blocks using a plurality of screens (Steps S107 and 108). For example, the registration data are displayed, as shown in the example of "TAKAHASHI" of FIG. 5B. Although being not illustrated, a symbol is desirably displayed to indicate that the block is divided into the sub-blocks. In this case, the control section 9 outputs the symbol to the display section 2 such that the symbol is displayed.

When a scroll instruction is detected from an operation of the operation section 3 (Step S109, YES) while the display is performed (Steps S106 and 108), the control advances to a Step S110 for the following block. Thus, the following block is displayed (Step S106).

On the other hand, when the scroll instruction is not detected (Step S109, NO), it is determined whether or not a call origination instruction is inputted from the operation section 3 (Step S111). When the call originating instruction is detected, a call originating operation is executed (Step S112). On the other hand, when the call originating instruction is not detected, the current state is maintained just as it is. Instead, the processing may be performed to return to the initial screen after a predetermined time.

In the call originating operation in the step S112, as shown in FIG. 6, when a number is given to each icon, it is possible to perform the call originating operation by the operation of the numeric key corresponding to this number in the display mode.

On the other hand, when any number is not given in the icon, the icon may be selected through a lateral scrolling operation of the operation section 3. Thus, it becomes possible to originate a call.

Also, serial numbers may be given the phone numbers to indicate an order (FIG. 6) when the phone numbers are displayed without displaying icons. In this case, it is possible that one phone number is selected so as to originate a call using one of the serial number. The control section 9 outputs the serial numbers to the display section 2 together with the phone numbers. Thus, the control section recognizes one of the phone numbers in response to the input of the serial number through the operation section 3.

Also, when any number are not given to indicate the order, the phone number may be selected through a lateral scrolling operation, as described above. Then, a call originating operation is performed.

When it is detected that the registration data impossible to be displayed once are registered for the same destination name, the registration data are displayed plural times (see FIG. 5B. In this case, it is desirable that the numbers starting from "1" are given to the icons in each display screen. The control section 9 manages screen numbers (sub-block numbers) and icon numbers. When a numeric key of the operation section 3 is operated in the display mode, the control section 9 executes the call originating operation based on the operation of the operation section 3, the sub-block number for the currently displayed screen and the icon number.

Next, an example of the call originating operation will be described below.

In the state shown in FIG. 6, it is supposed that a numeric key of the operation section 3 corresponding to the number given to the displayed icon is pushed down. At this time, a call is originated to the phone number corresponding to the icon to which the number is given. For example, when the numeric key of "3" is pushed down, a call is originated to the phone number of the portable phone which is registered as the third icon. In this case, the control section 9 recognizes the data "3" and searches the storage section 11 for the desired destination phone number based on the data "3" and the destination name for the currently displayed block, using the sub-block number, if necessary. If the control section 9 holds the registration data for the currently displayed block, the control section 9 can know the desired destination phone number by searching the held registration data without searching the storage section 11.

Figure 8:
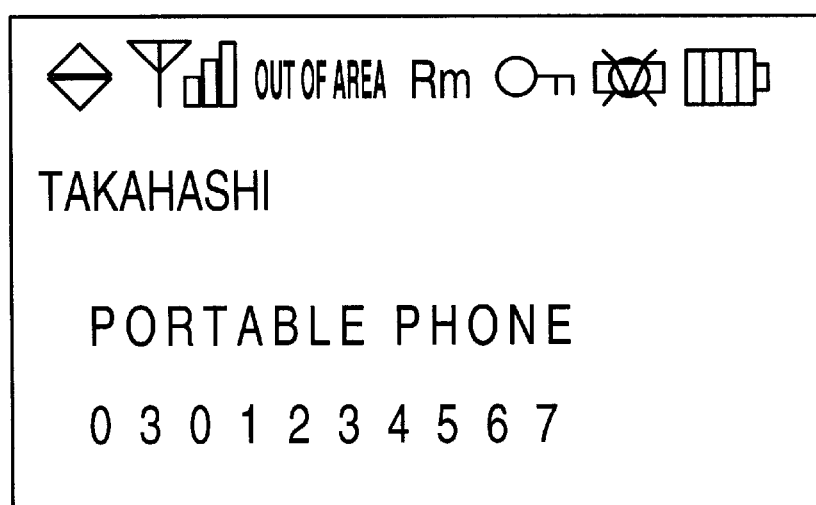
FIG. 8 is a diagram to a display example after a call originating operation in the embodiment of the present invention.

It should be noted that a special operation different from the usual operation may be performed in such a manner that one of ten keys continues to be pushed down for a time equal to or longer than a predetermined time in the state shown in FIG. 6. In this case, the phone number that is registered for the specified icon may be displayed as shown in FIG. 8. At this time, a call key of the operation section 3 is operated in the state shown in FIG. 8 so that a call may be originated. In this case, the control section 9 recognizes the specified icon and the special operation and outputs the phone number for the specified icon to the display section in place of the icon. Thus, the phone number can be displayed, as shown in FIG. 8.

Figure 9:
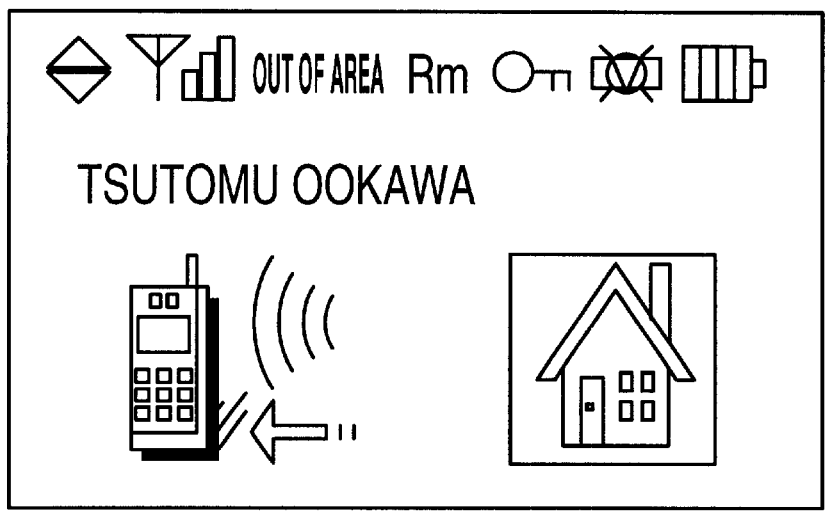
FIG. 9 is a diagram to explain a display example during the call originating operation in the embodiment of the present invention.
Figure 10:
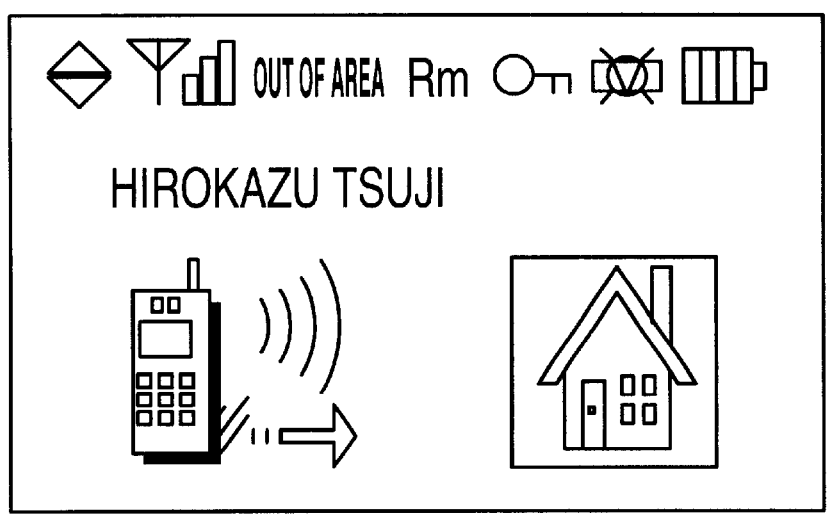
FIG. 10 is a diagram to explain a display example during a call arriving operation in the embodiment of the present invention.

FIG. 9 and FIG. 10 show a display screen during the call originating operation and a call arrival operation, respectively.

An example shown inn FIG. 9 shows that it is displayed on the display section 2 that a call originating operation is being performed. In this example, it is possible to recognize that the call originating operation is being performed to the portable phone of "Tsutomu OOKAWA".

In FIG. 10, the call arriving state is displayed on the display section 2 during the call arriving operation. In the portable phone system, because an ID of the call originating side can be received. Therefore, when the ID of the call originating side is received, the control section 9 may refer to the storage section 11 based on the phone number corresponding to the received ID of the call originating side to read out a name and an icon of the registration data. Then, the control section 9 controls the display section 2 to display the icon and name for the call originating side based on the read out name and icon.

In the example shown in FIG. 10, the call is received from a "portable phone" of "Tsutomu OOKAWA". The name of the call originating side is displayed on the display section. In this case, however, the name may be displayed by use of kannji or Japanese kana character.

In either of cases shown in FIGS. 9 and 10, it is possible to know the data classification of the destination phone number can be easily by using the icon.

In the above-mentioned embodiment, the portable phone is described. However, the present invention is not limited to this. The present invention can be applied to various types of phones such as PHS, a cordless phone and a wire phone.

As described above, in the present invention, a plurality of kinds of phone numbers can be displayed for every same destination name, when a plurality of registration data are randomly registered. Also, the classification data indicative of the kind of the phone number is displayed. Therefore, it is possible for the user to easily recognize the desired destination phone number through visual recognition.

Further, the call originating operation can be simplified, and the call originating operation and call arriving operation can be easily recognized during the operations.

What is claimed is:

1. A telephone apparatus comprising:

a display unit:

a storage unit for storing a plurality of registration data sets randomly registered, wherein each of said plurality of registration data sets includes a destination name and a phone number of said destination;

grouping means for automatically grouping said plurality of registration data sets into blocks; and display control means for controlling said display unit such that at least a part of each of said plurality of registration data sets is displayed in units of blocks in a display mode, wherein said display control means controls said display unit to display a call arrival image when a call arriving operation is being performed, and said display control means retrieves one of said plurality of registration data sets corresponding to a call originating side and controls said display unit to display at least a part of said retrieved registration data set.

2. A method of handling registration data in a telephone apparatus comprising the steps of:

randomly registering a plurality of registration data sets, wherein each of said plurality of registration data sets includes a destination name and a phone number of said destination;

automatically grouping said plurality of registration data sets into blocks;

displaying at least a part said plurality of registration data sets in units of blocks in display mode, wherein said displaying step includes displaying a call arrival image when a call arriving operation is being preformed, and said displaying step includes retrieving one of said plurality of registration data sets corresponding to a call originating side; and displaying at least a part of said retrieved registration data set.

* * * * *